June 21, 1966  C. L. WHITEFORD  3,257,062
HERMETICALLY SEALED TRANSPARENT SHOCK ABSORBING
PACKAGE FOR FRAGILE ARTICLES
Filed Feb. 13, 1963  2 Sheets-Sheet 1
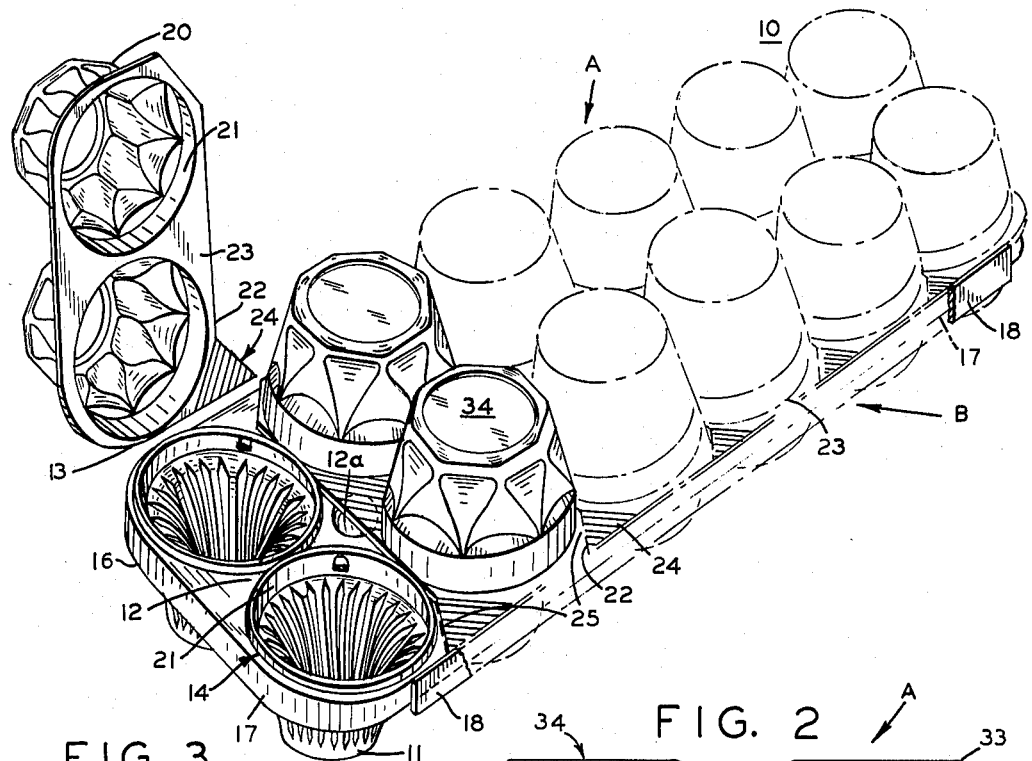
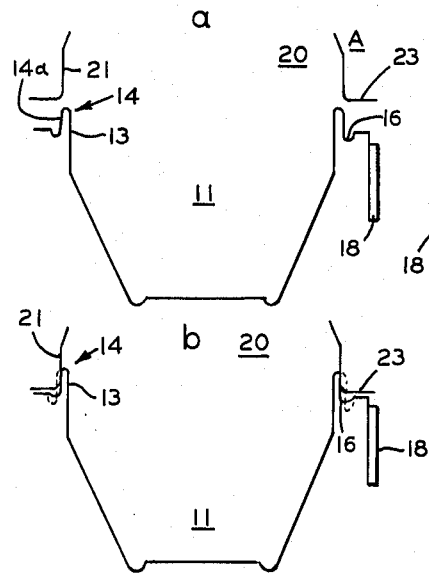
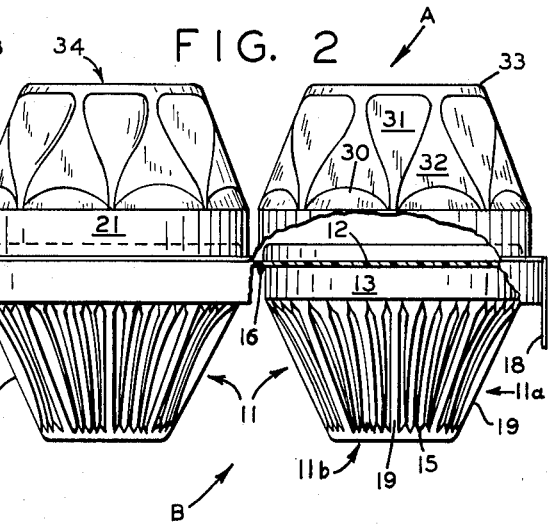
INVENTOR.
CARLTON L. WHITEFORD
BY
*Pillars and Bowyer*
ATTORNEY.

June 21, 1966  C. L. WHITEFORD  3,257,062
HERMETICALLY SEALED TRANSPARENT SHOCK ABSORBING
PACKAGE FOR FRAGILE ARTICLES
Filed Feb. 13, 1963
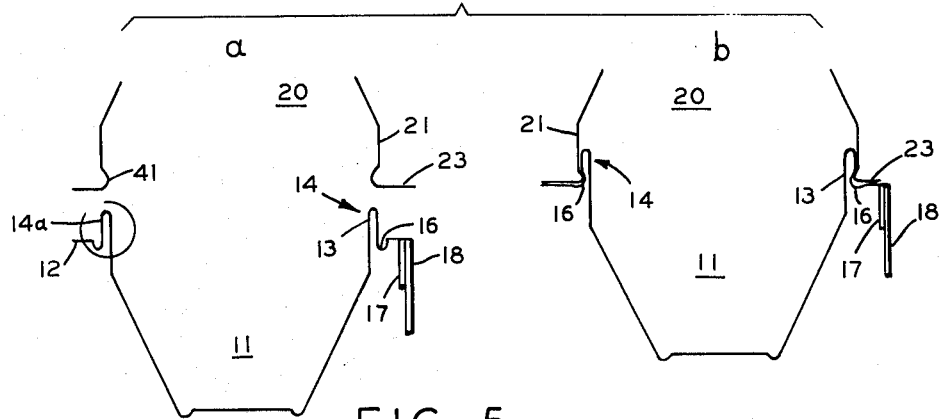
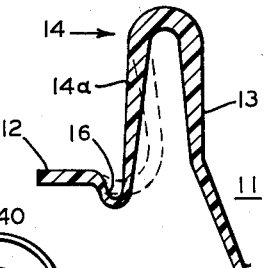
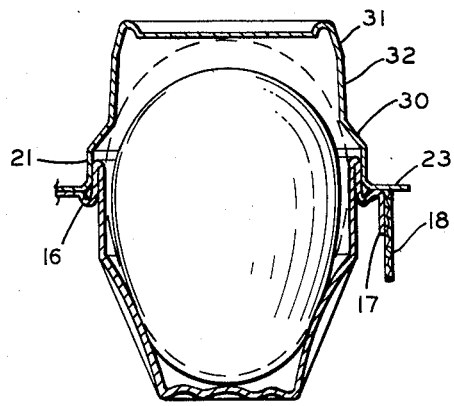
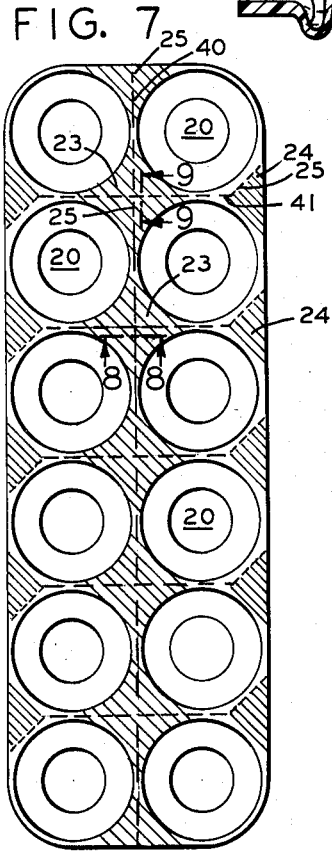
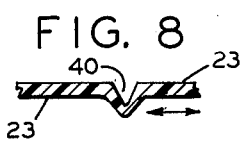
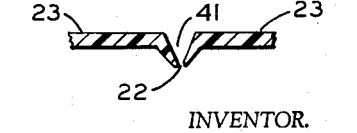
INVENTOR.
CARLTON L WHITEFORD United States Patent Office 3,257,062
Patented June 21, 1966

3,257,062
HERMETICALLY SEALED TRANSPARENT SHOCK ABSORBING PACKAGE FOR FRAGILE ARTICLES
Carlton L. Whiteford, New Canaan, Conn.
Filed Feb. 13, 1963, Ser. No. 258,232
21 Claims. (Cl. 229—2.5)

This application is a continuation-in-part of my copending application Serial No. 852,059, filed November 10, 1959, now U.S. Patent No. 3,131,846, granted May 5, 1964. This invention is an improved version of the egg carton disclosed in my copending application Serial No. 852,059.

This invention relates to a carton which is particularly useful for packaging food articles that retain their freshness when sealed from ambient atmosphere. More particularly the present preferred form of the invention as disclosed herein pertains to a multi-cell carton for eggs in which the eggs can be kept fresh for a longer period of time than heretofore, since the ageing process is greatly retarded if the eggs are sealed from ambient atmosphere.

Briefly the improved egg carton of this invention comprises a pair of separate complementary sections having a plurality of egg cell halves (not necessarily equal halves) protruding from an integral web. The carton is preferably made from a sheet of thermoplastic material such as polystyrene, having a thickness on the order of 10 to 15 mils. Any other suitable thermoplastic may also be used. However, it is necessary that the thermoplastic used in at least one section have resilient characteristics. In other words, while both sections may be made of resilient thermoplastic material, if the thermoplastic used for one section is rigid, high strength material such as biaxially oriented polystyrene, polypropylene, polyester (Mylar, a product of du Pont Company), or vinylidene chloride and vinyl chloride copolymer, the other section must be of a resilient nature such as un-oriented impact styrene polypropylene, linear polyethylene, ABS polymers, or cellulose acetate butyrate or other resilient polymers or copolymers.

For overall best results, according to this invention, it is presently preferred to make one carton section (preferably the cover) of rigid, high strength material and the other section (preferably the bottom section) of a less rigid, high strength or resilient material such as noted above.

To form the carton sections a thermoplastic sheet is placed in a press, heated and under differential fluid pressure the sheet is forced into a suitable mold as is presently known and practiced. Like the carton according to the above-identified copending application, the carton sections of this invention, can be nested and stacked one within another for economic transit and do not require any setting-up operations prior to being filled. Once filled, the carton is quickly and simply closed and automatically the cells thus formed seals the enclosed egg from the surrounding ambient atmosphere. In addition to providing sealed egg cells, the egg in each cell is resiliently suspended and protected against "rattling" whereby egg spoilage and breakage are materially reduced.

The improved version of the egg carton disclosed herein differs from its predecessor in that the need for a sealing compound of tacky gasket type adhesive between the carton sections and surrounding the egg cell halves is eliminated, while still providing a sealed egg cell. This is accomplished by providing an annular protrusion about the entrance portion of the cell halves of one of the carton sections which is press fitted into the annular entrance portion of the complementary cell half of the other section. However, due to slight variations, i.e. imperfect circles, inherent in the formation or manufacture of the egg cell halves, an effective seal is best achieved by providing an annular recess adjacent the aforementioned protrusion. This annular recess provides the necessary flexibility to allow the annular protrusion to automatically adjust to the imperfection of the mating part so that a tight fit is obtained over the entire circumference of the interfitted portions of the cell halves irrespective of tolerable manufacturing variations as will appear more clearly from a description of the appended drawings.

A further feature of the invention is the provision of means by which the press-fitted parts forming a sealed egg cell are locked together against accidental opening during normal handling of the egg carton as will also appear more clearly from the following more detailed description of the invention as seen in the accompanying drawing.

In addition to the above-noted annular recess in one section of the carton which automatically allows for the inherent manufacturing variations noted above, the other section, preferably the top section, is provided with longitudinal and transverse V- or U-shaped grooves between adjacent cups or pockets to compensate for longitudinal center-to-center variations between complementary cups in each section of the egg carton. The grooves provide the necessary flexibility but in addition the grooves may also be die cut to insure automatic adjustability.

The above-described die cutting is preferred, however, for the reason that an egg carton, normally comprising a dozen cells, can be opened two cells at a time without disturbing the sealed condition of the remaining cells and eggs within the carton. In addition to this feature and complementary thereto, provision is also made for anti-tear means that prevent material such as biaxially or uniaxially oriented thermoplastic material from tearing outside the area or line provided for opening a pair of cells. Anti-tear means for thermoplastic materials is fully disclosed in my copending application, Serial No. 28,656, filed May 12, 1960, now U.S. Patent No. 3,186,576, granted June 1, 1965.

A further feature of the egg carton of this invention is the provision of a peripheral skirt around the egg carton to which rigid strips are secured to strengthen the carton and also provide an egg tray consisting of the bottom section of the carton.

From the foregoing it will be apparent that the principal object of this invention is to provide an improved, sealed egg carton of the type disclosed in my copending application Serial No. 852,059 (noted above).

An additional object of the invention is to provide a two part egg carton comprising a plurality of discrete cups which form sealed egg cells when the cups are united upon closure of the carton.

An additional object of the invention is to provide an egg carton in which the egg cups forming a sealed egg cell are provided with means to lock said cups in sealed relation.

Another object of the invention is to provide a two-piece egg carton of thermoplastic material having different rigidity characteristics whereby an effective sealed and locked joint may be formed by complementary means integral with said pieces.

Another object of this invention is the provision of means in a sealed joint two-part egg carton whereby provision is made for coaxially aligning the sealing means of each section.

The above objects and additional objects and advantages will become apparent from the following detailed description of the drawing illustrating the invention in connection with a carton for eggs. Of course it will be understood by those skilled in the art that the invention is not intended to be limited to a packaging device for eggs alone and may be utilized for other like perishable goods.

In the drawing like reference numerals indicate like parts throughout and:

FIGURE 1 shows a partly detailed, partly phantom perspective view of an egg carton according to this invention in which two cells have been opened by removal of a portion of the cover;

FIGURE 2 is a side or end elevation view, partly cut away of the carton illustrated in FIGURE 1;

FIGURE 3 is a diagrammatic side elevational view of FIGURE 2 illustrating the operation of the telescoping portions in providing a simple press fit therebetween despite minor variation in the manufacture of the carton;

FIGURE 4 illustrates a modification of the entrance portion of the top cup shown in FIGURE 3 wherein a press plus a snap or locking fit is provided by an inwardly directed annular bead about the top cup;

FIGURE 5 illustrates, on a greatly enlarged scale, the gauge variations of the annular protrusion and recess of the cup of the bottom section (encircled in FIG. 4a) whereby the outer wall of the rim is resiliently coupled to the web;

FIGURE 6 is a cross-sectional view of the egg cell of the invention illustrating the function of the side wall configuration of the top cup in preventing egg rattle of large eggs and a resilient bumper for smaller eggs;

FIGURE 7 is a simplified top view of an egg carton according to the invention;

FIGURE 8 is a cross-sectional elevation taken along line 8—8 of FIGURE 7; and

FIGURE 9 is a cross-sectional elevation taken along line 9—9 of FIGURE 8.

Referring to the drawing, FIGURES 1 and 2 illustrate a presently preferred embodiment of an egg package according to this invention, generally indicated by reference numeral 10. The package comprises a top section A of rigid, high strength thermoplastic material such as biaxially oriented polystyrene, polypropylene, polyesters, vinylidene chloride and vinyl chloride copolymers and a bottom section B of resilient un-oriented impact styrene, etc., as previously enumerated. Each section of the package 10 contains a plurality of complementary compartments or generally cup-shaped members having side walls and an end wall. Each cup of both sections A and B may be of the same configuration; however, for eggs graded as large, the cups in the top section A, enclosing the large end of an egg, are preferably of a larger volume than the complementary cup in section B. That is, the diameter of the end wall of a cup enclosing the large end of an egg is made greater than the diameter of the end wall of the complementary cup enclosing the small end of the same egg. Since the diameter of the cylindrical entrance portion of each cup is approximately the same (the differences being fully described hereafter) in both sections A and B, the inclination of the side walls of the large cup are less than the inclination of the side wall of the small cup. As a result, the configuration of each cup is generally the same but the volume of the receptacle formed by the cups is unequal.

While not necessarily apparent from the drawing, it is also contemplated to make the height (or depth) of the cups in sections A and B of different dimensions. For example, the depth of cups in the bottom section B may be much shallower than the cups in the top section A. In such an arrangement the bottom section mainly provides resilient support for the egg while the top section prevents or cushions rattling movement of the egg contained in a cell. The reverse arrangement is also contemplated, for example, the bottom section B of the carton may have deep cups, say ⅗ the height, or longitudinal dimension of an egg, and the top section has shallow cups, say ⅖ the length of an egg. In this arrangement the bottom section B will resiliently support the eggs while the primary function of the top section A is to prevent egg rattle, and of course form a cover for the hermetically sealed package.

Preferably the top section of the egg carton is made of transparent thermoplastic material, for example, biaxially oriented polystyrene, to provide ready visual examination of the contents of cartons. Additionally, the end wall of a top cup is recessed to receive a bottom cup for stacking purposes, as more fully described in the above-identified copending application. The bottom section B may be of translucent or opaque flexible material such as un-oriented impact styrene or other suitable flexible thermoplastic resin and each cup 11 of the bottom section B is made integral with an embossed or ribbed web 12 to impart rigidity to the carton.

When the top and bottom sections A and B are closed, a seal is formed about each cup half by press fitting the annular protrusion 14 at the opening 13 of each of the cups of the lower section B into the cylindrical entrance 21 of the complementary cups 20 of section A. As a result the closed egg cell thus formed has an air tight joint where the respective cups are united. However, as indicated above, it is not possible, as a practical matter, to manufacture egg cartons without variable tolerances in mass producing an egg carton of the type illustrated. Therefore, to compensate for these variations, within maintainable tolerences, each of the protrusions 14 is coaxial with an annular depression or recess 16 more fully described hereinafter in connection with FIGURE 3.

To facilitate opening the carton the web width of upper section A may be made slightly larger so that it overhangs the longitudinal margins of the lower section B. However, the webs at the ends and the four outside corners are flush. Primarily, opening or removal of cover A is facilitated in that between each pair of cups 20 of section A a die cut 21 is made in the web 23 of the cover so that a pair of laterally adjacent cups of the top section can be readily removed to open two cells without disturbing the sealed eggs remaining in the carton. Also, along the longitudinal edges of the top section triangular shaped corrugated areas 24 are provided to form gripping tabs. The triangular shaped corrugations 24 also unilaterally orient the corrugated material in a direction substantially at right angles to the troughs formed by the corrugations to provide tear resistance so the tabs do not break away, as fully described in my co-pending application Serial No. 28,656, filed May 12, 1960. That is, the bridges 25 interrupting the die cut 22 are to be broken to open a pair of cells and the corrugation prevents a tear developing along the tab or triangle 24 resulting in the loss of a finger grip without breaking the bridge 25. In addition, the side of the triangular corrugated areas opposite the bridges 25 function as a hinge about which the triangles or tabs 24 are bent or rotated when lifted, to rupture the bridge means and allow removal of the top cups of the carton a pair at a time.

Still referring to FIGURE 1, flange or skirt 17 is provided as a surface upon which strengthening boards 18 may be attached to rigidify the carton along its longitudinal axis. These boards may be stiff paper, plastic or any suitable material and the outer surface of the board provides a surface to which a label can be glued or otherwise secured, or printed directly thereupon.

A discontinuous stiffening rib or cylindrical recess 12a, disposed along a central longitudinal axis of the web 12 of section B also provides longitudinal rigidity to this section, which in turn helps impart rigidity to the completed package.

As illustrated best in FIGURE 2, cups 11 of section B supporting the weight of an egg comprise a generally frustro-conical recepticle having a cylindrical entrance portion 13, a side wall generally designated 11a and an end wall generally dsignated 11b. The cylindrical portion 13 is integrally connected to web 14 via annular protrusion 14 and associated intermediate annular recess 16. Side wall 11a comprises a plurality of circumferentially spaced upstanding ribs 19 interposed between circumferentially space resiliently expandable panel members 15, both of which depend from cylindrical portion 13 and are joined to the end wall by an annular radius. Panels 15 are curved inwardly between the cylinder 13 and the connecting corner with the bottom wall whereby the inside diameter of panels 15 is less than the inside diameter of ribs 19. As a result of the inward curvature of panels 15, an egg within cup 11 of section B is resiliently supported by panels 15 at a surface adjacent the strong ends of the egg It is noted that panels 15 can be partially smooth surfaced, in other words, formed without full corrugations, pleats or flutes. However, a pleated panel is preferred since the pleats increase the resiliency and expanability characteristics of the egg cells. This is especially important with large heavy eggs whereas the small light eggs may be suitably suspended by smoother panel members.

It will be evident from FIGURE 1 that each section A and B of package 10 is made from a single sheet of thermoplastic resin, the bottom section B comprising a rigid framework and resiliently flexible side wall panels in the cup members. The rigid framework supporting the side wall panels 15 and end wall 11b comprises web 12, including the cylindrical portion 13 of cup 11, and side wall ribs 19. As indicated above, the frame does not contact the egg but simply provides a strong anchoring means for the resilient panels 15 and the end wall 11b. Also, this frame is strong enough to support the weight of several egg cartons stacked one upon another when crated for shipment to the market place.

The presently preferred configuration of the covering cups 20 of the top section of the egg carton is best illustrated in FIGURES 2 and 6. In addition to enclosing the large end of the eggs and forming a sealed cell with the cups of section B, the top cups must cushion eggs against excessive rattling, thereby preventing breakage. These cups therefore comprise a cylindrical entrance portion 21 which is of a slightly smaller inside dimension than the outside dimension of the protrusion 14 for the purpose fully described hereinafter in connection with FIGURE 3. A plurality of inwardly directed arcuate elements 30 and flat surfaced generally triangular elements 31 and 32 comprise the side wall of the cup. The circumferentially extending connected flat panels 31 extend into the annular radius 33. This radius terminates in a recessed disc 34 into which the bottoms of the lower cups of the cartons fit to allow the egg cartons to be safely stacked, one upon another. It is noted that the cups of the top section are slightly deeper than the corresponding lower cup, so that an egg is readily gripped by the fingers for easy removal.

Referring now to the schematic views a and b of FIGURE 3, it will be seen that a seal is obtained between each cup forming an egg cell by press fitting the cylindrical entrance portion 21 of the top cuts over the upstanding rim 14 of the lower cups. As noted above, due to inaccuracies inherent in their manufacture, a suitable press fit, which will effectively seal the telescoped cup portions, can best be attained with the required consistency if the protruding rim 14 is connected to the web 12 by an annular recess 16. In addition to allowing slightly out-of-round rings of unequal diameter to telescopically form a press fit, the recess 16 acts as a tension spring to hold the outer wall of the rim 14 against the inner surface of the entrance portion of the top cup and improve the press fit therebetween. This action is illustrated by comparing the dotted lines and full lines of FIGURE 3b. As noted hereinbefore, the inside diameter of the cylindrical entrance portion 21 of the top cup 20 is made smaller than the outside diameter 14a of the hollow rim portion 14 of the lower cup 11.

The degree of difference in these diameters may be varied according to the material used in manufacturing the carton and the forces desired of the press fit which will effect a good seal and also allow ready removal of the top cups to open the carton cells when desired.

FIGURE 4 illustrates a modification of the seal and press fit arrangement previously described and illustrated. The arrangement of FIGURE 4 is presently preferred to that of the above-described FIGURE 3, since it provides a locking engagement as well as a sealing press fit between the telescoping portions of the egg cells according to the invention. The configuration of the bottom cups 11 and rims 14 is the same in each modification but, as seen in FIGURE 4a, the cylindrical entrance portion 21 of the top or covering cup 20 is formed with a reentrant portion or inwardly directed annulus 41. The annular locking ring 41, as seen in FIGURE 4b, is provided to distort the outer wall 14a of the hollow upstanding rim 14 of the bottom cups 11. Due to the relatively greater rigidity and stiffness of the oriented thermoplastic material from which the cups 20 are formed, the ring 41 is locked beneath the arc intermediate the inner and outer wall of rim 14.

It will be apparent from FIGURES 4a and 4b that a distortion-seal is formed, as opposed to a press fit or friction seal as shown in FIGURE 3, so that the top and bottom cups are locked in telescoped relation against accidental opening during normal handling of an egg carton.

The arrangements of both FIGURES 3 and 4 utilize the annular spring means 16 to provide movement of the outer wall 14a of the rim 14 while closing or snapping the cups 11 and 20 together to form a sealed egg cell. Also, the annular spring 16 holds the rim wall 14a firmly against the inner surface of the entrance portion 21 of the covering cups 20 during normal flexing of the egg carton while being handled as well as to provide for tolerance variations in the manufacture of the egg carton according to the invention.

FIGURE 5 is an enlarged view of the rim portion 14 of a bottom cup 11 illustrating the variations of material thickness thereof which also contribute to the successful achievement of an effective seal, or seal and lock, between the egg cups 11 and 20 of the package 10. It is again noted that the material forming the bottom cups 11 and rim 14 is a resilient thermoplastic material. As indicated by the dotted lines in FIGURE 5, the outer wall 14a of the inverted U-shaped rim 14 is provided with a degree of flexibility about the juncture of rim wall 14a and entrance portion 13 of the rim due to the configuration and thickness variations illustrated. Thus, the wall 14a moves toward the wall 13 when a top cup is pressed over the rim. The wall 14a being urged toward the position shown in the full lines of FIGURE 5 by the resiliency of the material forming the juncture, or arc between walls 13 and 14a, and the spring action of the annular recess 16 between wall 14a and the web 12. It will be evident from the foregoing, taken with the illustration of FIGURE 5, that without the annulus 16 the side 14a would be quite rigidly and immovably held by the web 12 and would tend to force or urge the telescoping portion of top cup vertically upwardly thus breaking a sealed joint therebetween. However, with the annulus 16 positioned as shown, this tendency is effectively minimized if not completely eliminated in practice. As shown in FIGURE 4, this tendency is further overcome by the use of locking ring 41 in the telescoping portion of the top cup 20. Ring 41, once having been forced down over the wall 14a, deforms the thin portion of the wall 14 adjacent the annulus 16 and holds the two cups securely in sealed position since the ring cannot readily slide upwardly over the outwardly inclined thick walled portion of the rim 14a or slide past the knob formed at the arc intermediate walls 13 and 14a as indicated by the dotted lines of FIGURE 5.

In FIGURE 6, the cushioning effect of the top cup is illustrated as previously described in connection with FIGURE 2. The dotted lines of this figure show the position of an egg within a cell of a sealed egg carton according to the invention. It will be seen that a large egg engages the arcuate elements 30 whereas a small egg, while free to move within the cell, will also engage the resilient arcuate elements 30 (see FIGURE 2, also) at a plurality of points to overcome the adverse effects of rattling, i.e. eliminate breakage by allowing a small egg to engage a shock absorbing portion of the cell at a point about its weakest section (large diameter).

Referring now to FIGURES 7, 8 and 9, wherein a simple presently preferred arrangement is shown to cope with manufacturing inaccuracies in the center-to-center spacing which will exist between the cups of the top section and the cups of the bottom section of the egg carton. It will be appreciated that these variations may not be significant as between laterally adjacent cups of the section, but a significant variation in center-to-center distance may exist in the longitudinal direction as between the end cups in the top and bottom sections. Therefore, to provide flexibility in the top section of rigid material and allow the cups to be aligned on centers, the rigid, relatively inflexible material of the top web 23 may be sharply grooved longitudinally between adjacent cup as at 40 of FIGURE 7. As indicated by the arrow in FIGURE 8, the groove 40 will provide a degree of flexibility of the material of web 23 so that variations of the center-to-center distance between laterally adjacent cups 20 is accounted for.

A like groove is made between longitudinally adjacent cups 20 of the top section but this groove 41 is die cut at 22 as shown in FIGURE 9. The free ends of the groove 41, die cut at 22, allow the cups to move away from one another and also act as flexible bumpers which allow the cups of the top section of rigid material to move closer to one another. Therefore, the cups 20 of the top section automatically align themselves with the bottom cups 11 as the top section A is pressed down onto the bottom section B to guarantee telescoping and sealing engagement between the rim 14 of cups 11 and the entrance portions 21 of cups 20. As indicated by the broken lines in FIG. 7, the grooves 40 and 41 are both shown die cut, which is desirable for biaxially oriented polystyrene. Such material is very rigid and has shrinkage and other characteristics tending to increase manufacturing variations. Additionally, of course, the die cut along the groove 40 interrupted only by bridges 25, allows a single cell to be opened without interrupting the seal of the adjacent cells. As indicated in FIGURES 1 and 7, bridges 25 are provided for interconnecting the laterally adjacent egg cups of the top section as best illustrated in FIGURE 1. It is noted here that the die cuts may be made directly without a groove, however the edges of a simple die cut may abut preventing movement of egg cups closer together where necessary for alignment.

The area of web 23 is also corrugated at 50, as seen in FIGURE 7, when necessary to add flexibility to very rigid material such as biaxially oriented polystyrene.

In addition to the above-described function, the die cut 22 also provides easy access to a pair of eggs in laterally adjacent cups without disturbing the sealed condition of the remaining eggs in an egg carton, since only two bridges 25 must be severed to open one pair of egg cells.

Having fully described my invention by way of examples of presently preferred embodiments thereof, what I claim and desire to secure by Letters Patent, is:

What I claim is:

1. A container comprising first and second members, each said member having a web portion and a plurality of laterally projecting receptacles having an entrance portion adjacent its associated web portion, at least one of said members having means for axially aligning the complementary receptacles of each said member, and interfitting means providing a press fitting connection extending continuously about the periphery of the entrance portion of each receptacle of each said member whereby complementary receptacles of each said member are removably united in closed relation.

2. A container according to claim 1, wherein said means providing a press fitting connection comprises an axially extending annular rim projecting from the entrance portion of the receptacle of one said member for telescopic union within the entrance portion of the complementary receptacles of the other member and resilient means interconnecting said rim and the associated web portion of said one member.

3. A container according to claim 2, wherein the entrance portion of the receptacles of the other of said members comprises an inwardly projecting rib for removably locking said rim in telescoped relation within the entrance portion of the receptacles of said other member.

4. A container comprising first and second members one of which is constituted of relatively rigid material, each said member having a web portion and a plurality of laterally projecting receptacles having an entrance portion adjacent its web portion, one of said members having means movably connecting the web portion and the associated receptacles for axially aligning the complementary receptacles of each said member, and interfitting means providing a press fitting connection extending continuously about the periphery of the entrance portion of each receptacle of each said member whereby complementary receptacles of each said member are removably united in closed relation.

5. A container according to claim 4, wherein said means providing a press fitting connection at the entrance portion of each said receptacle includes means for removably locking said members in telescoped relation.

6. A container comprising a first member constituted of a flexible thermoplastic material and a second member constituted of relatively rigid thermoplastic material, each said member having a web portion and a plurality of laterally projecting receptacles having a curvilinear entrance portion, said rigid member having means movably connecting the web portion and the associated receptacles for axially aligning the complementary receptacles of each said member, means attached to said resilient member for strengthening said container, and interfitting means providing a press fitting connection extending continuously about the periphery of the entrance portion of each receptacle of each said member whereby complementary receptacles of each said member are removably united in closed relation.

7. A container comprising a first member constituted of a flexible thermoplastic material and a second member constituted of relatively rigid thermoplastic material, each said member having a web portion and a plurality of laterally projecting receptacles having a curvilinear entrance portion, said rigid member having means movably connecting the web portion and the associated receptacles for axially aligning the complementary receptacles of each said member, means attached to said resilient member for strengthening said container, interfitting means providing a press fitting connection extending continuously about the periphery of the entrance portion of each receptacle of each said member and means connected with said last-named means for removably locking said press fitting connection against accidental opening whereby the complementary receptacles of each said member are removably united in closed relation.

8. A container comprising a first member constituted of a flexible thermoplastic material and a second member constituted of a relatively rigid thermoplastic material, each said member having a web portion and a plurality of laterally projecting receptacles having a substantially cylindrical entrance portion, means movably interconnecting the web portion and the associated receptacles of said second member for axially aligning the complementary receptacles of each said member, a radially flexible annular rim means connected with and extending continuously about the periphery of the entrance portion of each receptacle of said first member and resiliently connected with the associated web portion of said first member for telescopic press fitted connection within the entrance portion of said second member whereby a plurality of closed enclosures are provided by said complementary receptacles.

9. A container comprising a first member constituted of a flexible thermoplastic material and a second member constituted of a relatively rigid thermoplastic material, each said member having a web portion and a plurality of laterally projecting receptacles having a substantially cylindrical entrance portion, a plurality of discontinuous longitudinal and lateral die cuts in the web portion of said second member between adjacent receptacles thereof and associated bridge means removably interconnecting said receptacles, said die cuts also providing movement of said receptacles for axially aligning the complementary receptacles of each said first and second member, a marginal skirt connected with the web portion of said first member, a rigidifying member attached to said skirt, an inverted generally U-shaped projection extending axially from the entrance portion of said first member and an annular recess connecting one wall of said U-shaped projection with the web portion of said first member for resiliently connecting said one wall and the associated web portion, a radially inwardly extending recess in the entrance portion of said second member whereby the entrance portions of each receptacle of said first and second member are removably locked in a telescoping press fitted relation providing a plurality of sealed enclosures in said container.

10. A container according to claim 9, wherein said die cuts are provided in grooves of the web portion of said second member.

11. A container according to claim 10, with the addition of a marginal skirt depending from the web portion of said first member and a rigidifying member attached to the longitudinal extension of said skirt for rigidifying said container in the longitudinal direction.

12. A container comprising a first member constituted of a flexible thermoplastic material and a second member constituted of a relatively rigid thermoplastic material, each said member having a web portion and a plurality of laterally projecting receptacles having a substantially cylindrical entrance portion adjacent its associated web portion, the receptacles of said flexible member having circumferentially spaced rigid upstanding ribs and intermediate flexible panels and the receptacles of said rigid member having a plurality of inwardly directed arcuate cushioning means adjacent said entrance portion of the said receptacles, a discontinuous die cut in the web portion of said second member between adjacent receptacles thereof defining a plurality of bridge means interconnecting said second web portion for axially aligning the complementary receptacles of said first and second members, radially flexible rim means connected with the entrance portion of each receptacle of said first member, means for resiliently connecting said rim means and the web of said first member, said rim means being telescopically press fitted within the entrance portion of the receptacles of said second member, means connected with the entrance portion of said second member for removably securing said rim telescopically within the entrance portion of said second member whereby said complementary receptacles define a plurality of sealed enclosures, a corrugated finger tab hingedly connected with the web portion of said second member for breaking said bridge means and removing the receptacles of said second member from the rim means of said first member.

13. A container according to claim 12, wherein said die cuts are made in corrugated areas of said web portion to prevent tearing of said rigid material.

14. A container according to claim 13, wherein said second member is constituted of a transparent thermoplastic material for observing the contents of said container.

15. A container comprising a first member constituted of a flexible material and a second member constituted of a relatively rigid material, each said member having a web portion and a plurality of laterally projecting receptacles having a cylindrical entrance portion, means moveably interconnecting the web portion and the associated receptacles of said second member for axially aligning the complementary receptacles of each said member, a radially flexible rim means connected with the entrance portion of each receptacle of said first member and resiliently connected with the associated web portion of said first member for telescopic press fitting connection within the entrance portion of said second member, said radially flexible rim means comprising a generally inverted U shaped projection axially extending from the entrance portion of the receptacles of said first member, and said resilient connection between said rim and the associated web portion comprises an annular recess intermediate the outer wall of said U shaped projection and said associated web portion.

16. A container comprising first and second members one of which is constituted of relatively rigid material, each said member having a web portion and a plurality of laterally projecting receptacles having an entrance portion, one of said members having means movably connecting the web portion and the associated receptacles for axially aligning the complementary receptacles of each said member, means providing a press fitting connection at the entrance portion of each receptacle of each said member whereby complementary receptacles of each said member are removably united in closed relation, wherein said means providing a press fitting connection comprises an inverted U-shaped projection extending laterally from the entrance portion of the receptacles of one said member for telescopic union within the entrance portion of the complementary receptacles of the other said member and resilient means interconnecting said U-shaped projection and the associated web portion of said one member.

17. A container comprising a first member constituted of a flexible thermoplastic material and a second member constituted of relatively rigid thermoplastic material, each said member having a web portion and a plurality of laterally projecting receptacles having a curvilinear entrance portion, said rigid member having means movably connecting the web portion and the associated receptacles for axially aligning the complementary receptacles of each said member, means attached to said resilient member for strengthening said container, means providing a press fitting connection at the entrance portion of each receptacle of each said member whereby complementary receptacles of each said member are removably united in closed relation, wherein said means for movably connecting the web portion and associated receptacles of said rigid member comprise a die cut extending between adjacent receptacles laterally and longitudinally of said member and bridge means intercepting said die cuts.

18. A container comprising a first member constituted of a flexible thermoplastic material and a second member constituted of relatively rigid thermoplastic material, each said member having a web portion and a plurality of laterally projecting receptacles having a curvilinear entrance portion, said rigid member having means movably connecting the web portion and the associated receptacles for axially aligning the complementary receptacles of each said member, means attached to said resilient member for strengthening said container, means providing a press fitting connection at the entrance portion of each receptacle of each said member whereby complementary receptacles of each said member are removably united in closed relation, wherein said means connected with said resilient member for strengthening said container comprises a skirt portion peripherally surrounding the web portion of said resilient member and a rigid label adhered to said skirt portion.

19. A container comprising a first member constituted of a flexible thermoplastic material and a second member constituted of relatively rigid thermoplastic material, each said member having a web portion and a plurality of laterally projecting receptacles having a curvilinear entrance portion, said rigid member having means movably connecting the web portion and the associated receptacles for axially aligning the complementary receptacles of each said member, means attached to said resilient member for strengthening said container, means providing a press fitting connection at the entrance portion of each receptacle of each said member whereby complementary receptacles of each said member are removably united in closed relation, wherein said means for providing a press fitting connection comprises a projection of inverted U-shaped cross-section extending laterally from the entrance portion of the receptacles of said flexible member for telescopic union within the entrance portion of the complementary receptacles of the rigid member.

20. A container comprising a first member constituted of a flexible thermoplastic material and a second member constituted of a relatively rigid thermoplastic material, each said member having a web portion and a plurality of laterally projecting receptacles having a substantially cylindrical entrance portion, means movably interconnecting the web portion and the associated receptacles of said second member for axially aligning the complementary receptacles of each said member, a radially flexible rim means connected with the entrance portion of each receptacle of said first member and resiliently connected with the associated web portion of said first member for telescopic press fitted connection within the entrance portion of said second member whereby a plurality of closed enclosures are provided by said complementary receptacles, said radially flexible rim means comprising a generally inverted U-shaped projection axially extending from the entrance portion of the receptacles of said first member, and said resilient connection between said rim and the associated web portion comprising an annular recess intermediate the outer wall of said U-shaped projection and said associated web portion.

21. A container comprising a first member constituted of a flexible thermoplastic material and a second member constituted of a relatively rigid thermoplastic material, each said member having a web portion and a plurality of laterally projecting receptacles having a substantially cylindrical entrance portion, means movably interconnecting the web portion and the associated receptacles of said second member for axially aligning the complementary receptacles of each said member, a radially flexible rim means connected with the entrance portion of each receptacle of said first member and resiliently connected with the associated web portion of said first member for telescopic press fitted connection within the entrance portion of said second member whereby a plurality of closed enclosures are provided by said complementary receptacles, and said means movably interconnecting the web portion and associated receptacles of said second member comprising a discontinuous die cut between adjacent receptacles defining a plurality of bridge means interconnecting said web portion.

References Cited by the Examiner
UNITED STATES PATENTS
2,939,602   6/1960   Grant _____ 229—2.5

THERON E. CONDON, *Primary Examiner.*

FRANKLIN T. GARRETT, JOSEPH R. LECLAIR, *Examiners.*

J. B. MARBERT, *Assistant Examiner.*